(12) United States Patent
Kijima et al.

(10) Patent No.: US 11,054,569 B2
(45) Date of Patent: Jul. 6, 2021

(54) ILLUMINATION DEVICE AND DISPLAY DEVICE

(71) Applicant: Japan Display Inc., Minato-ku (JP)

(72) Inventors: Hiroaki Kijima, Tokyo (JP); Shinichi Komura, Tokyo (JP); Yoichi Asakawa, Tokyo (JP); Ken Onoda, Tokyo (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 16/984,393

(22) Filed: Aug. 4, 2020

(65) Prior Publication Data

US 2021/0041620 A1 Feb. 11, 2021

(30) Foreign Application Priority Data

Aug. 6, 2019 (JP) .............................. JP2019-144558

(51) Int. Cl.
*F21V 8/00* (2006.01)

(52) U.S. Cl.
CPC ......... *G02B 6/0076* (2013.01); *G02B 6/0035* (2013.01)

(58) Field of Classification Search
CPC ............................. G02B 6/0076; G02B 6/0036
See application file for complete search history.

(56) References Cited

U.S. PATENT DOCUMENTS

| 6,515,722 B1* | 2/2003 | Watanabe | G02B 6/0036 349/61 |
| 2007/0230216 A1* | 10/2007 | Ite | G02B 6/0038 362/620 |
| 2008/0204631 A1* | 8/2008 | Takada | G02B 6/0068 349/65 |

FOREIGN PATENT DOCUMENTS

JP 2011-238484 A 11/2011

* cited by examiner

*Primary Examiner* — Sean P Gramling
(74) *Attorney, Agent, or Firm* — Oblon, McClelland, Maier & Neustadt, L.L.P.

(57) ABSTRACT

According to one embodiment, the illumination device includes a first area, a second area, a first light guide, a plurality of first light sources, a second light guide, a plurality of second light sources, a first layer and a second layer. The first layer extends from the first area over a boundary between the first area and the second area, to between a second side surface of the first light guide and the boundary. The second layer extends from the second area over the boundary to between a third side surface of the second light guide and the boundary.

12 Claims, 8 Drawing Sheets

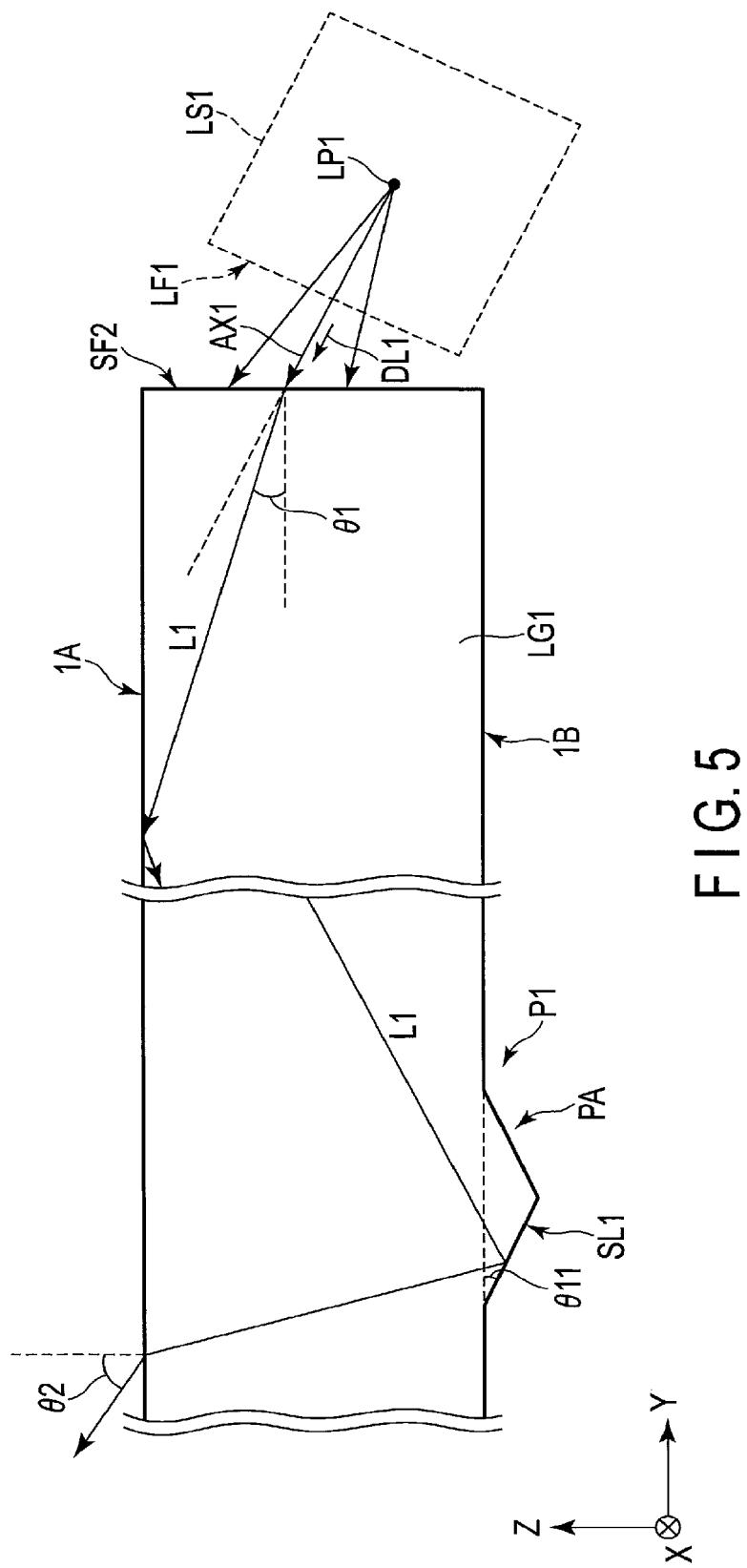
F I G. 5

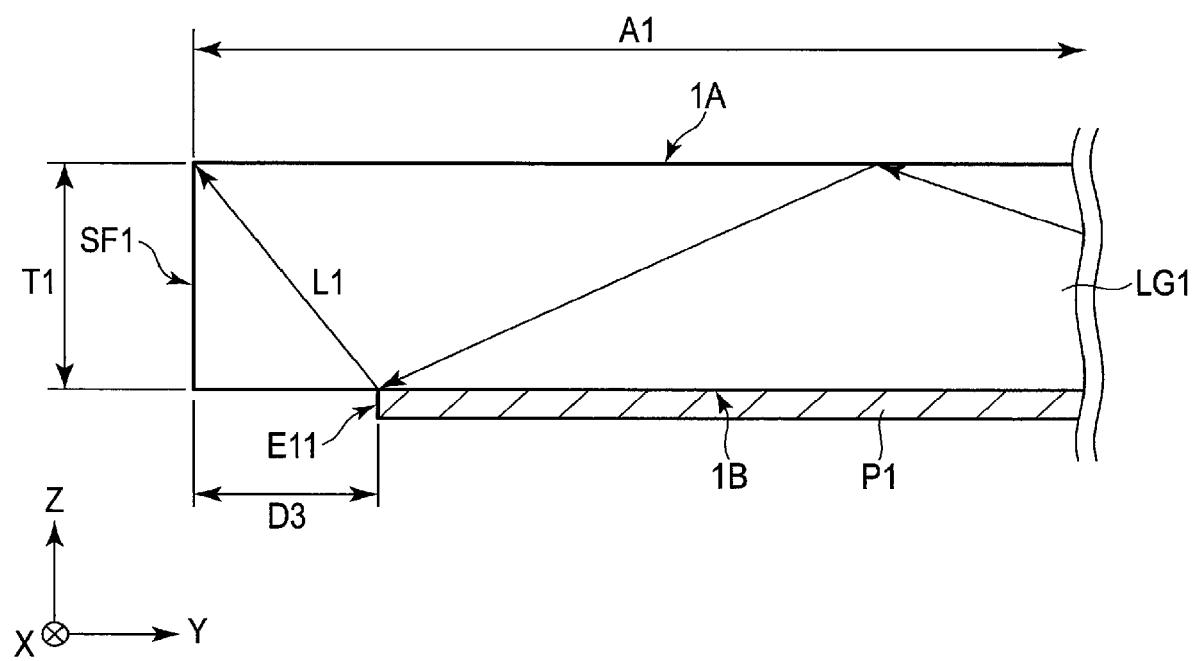
F I G. 7

ILLUMINATION DEVICE AND DISPLAY DEVICE

CROSS-REFERENCE TO RELATED APPLICATIONS

This application is based upon and claims the benefit of priority from Japanese Patent Application No. 2019-144558, filed Aug. 6, 2019, the entire contents of which are incorporated herein by reference.

FIELD

Embodiments described herein relate generally to an illumination device and a display device.

BACKGROUND

Display devices such as liquid crystal display devices, for example, comprise a display panel containing pixels and an illumination device such as a backlight for illuminating the display panel. The illumination device comprises a light source which emits light and a light guide to which light from the light source is irradiated. The light from the light source enters the light guide from a side surface thereof, propagates inside the light guide, and is emitted from an emission surface which corresponds to one of main surfaces of the light guide.

When non-uniformity of luminance occurs in the emission surface of the light guide, the quality of images displayed by the display panel can be degraded as well. For example, when the viewing angle of light emitted from the light source is narrow, a desired luminance may not be obtained in a region close to the light source on the emission surface of the light guide. In this case, in the region near the light source of the emission surface, light of a luminance sufficient for the display panel cannot be supplied.

BRIEF DESCRIPTION OF THE DRAWINGS

FIG. 5 is a partial cross section of the light guide, the first layer and the light source shown in FIG. 3.

FIG. 7 is a cross section of the first layer and the light guide near the side surface.

DETAILED DESCRIPTION

Figure 1:
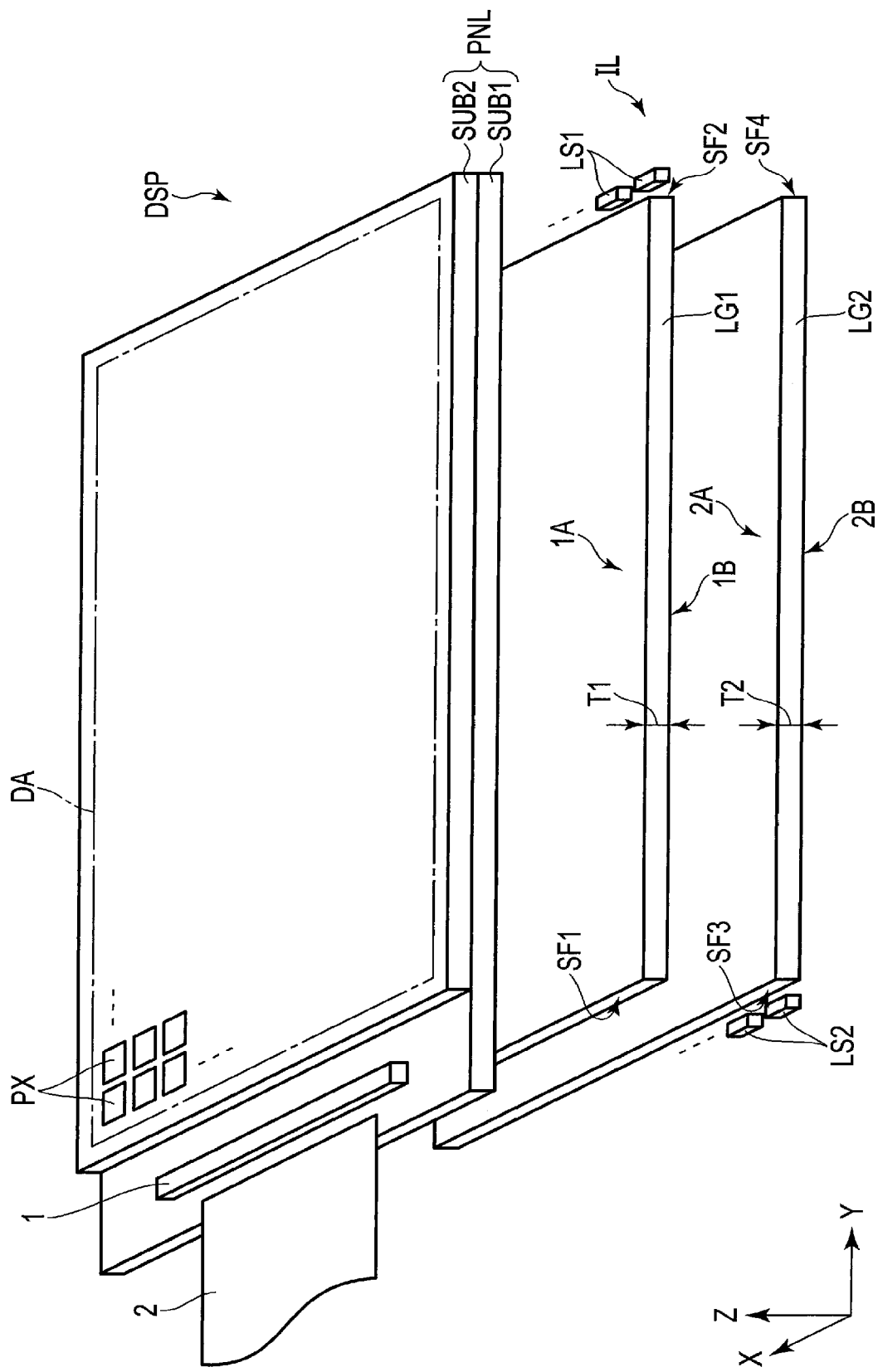
FIG. 1 is a decomposed perspective view showing a configuration example of a display device of an embodiment.

In general, according to one embodiment, there is provided an illumination device comprising: a first area; a second area adjacent to the first area in a first direction; a first light guide comprising a first main surface located in the first area and the second area, a second main surface located in the first area and the second area, on an opposite side to the first main surface, a first side surface located in the first area and a second side surface located in the second area on an opposite side to the first side surface in the first direction; a plurality of first light sources opposing the second side surface; a second light guide comprising a third main surface opposing the second main surface and located in the first area and the second area, a fourth main surface located in the first area and the second area, on an opposite side to the third main surface, a third side surface located in the first area, and a fourth side surface located in the second area and opposing the third side surface in the first direction; a plurality of second light sources opposing the third side surface; a first layer including a plurality of first prisms provided on the second main surface; and a second layer including a plurality of second prisms provided on the fourth main surface. The first layer extends from the first area over a boundary between the first area and the second area to between the second side surface and the boundary, and the second layer extends from the second area over the boundary to between the third side surface and the boundary.

According to another embodiment, there is provided a display device comprising: an illumination device; and a display panel which displays images. The illumination device comprises a first area; a second area adjacent to the first area in a first direction; a first light guide comprising a first main surface located in the first area and the second area, a second main surface located in the first area and the second area, on an opposite side to the first main surface, a first side surface located in the first area and a second side surface located in the second area on an opposite side to the first side surface in the first direction; a plurality of first light sources opposing the second side surface; a second light guide comprising a third main surface opposing the second main surface and located in the first area and the second area, a fourth main surface located in the first area and the second area, on an opposite side to the third main surface, a third side surface located in the first area, and a fourth side surface located in the second area and opposing the third side surface in the first direction; a plurality of second light sources opposing the third side surface; a first layer including a plurality of first prisms provided on the second main surface; and a second layer including a plurality of second prisms provided on the fourth main surface. The first layer extending from the first area over a boundary between the first area and the second area to between the second side surface and the boundary, and the second layer extending from the second area over the boundary to between the third side surface and the boundary. The display panel oppose the first main surface.

Embodiments will be described hereinafter with reference to the accompanying drawings. The disclosure is a mere example, and arbitrary change of gist which can be easily conceived by a person of ordinary skill in the art naturally falls within the inventive scope.

To more clarify the explanations, the drawings may pictorially show width, thickness, shape and the like, of each portion as compared with an actual aspect, but they are mere examples and do not restrict the interpretation of the invention. In the present specification and drawings, elements like or similar to those in the already described drawings may be denoted by similar reference numbers and their detailed descriptions may be arbitrarily omitted.

In the embodiments, a transmissive liquid crystal display device will be explained as an example of the display device DSP. Note that the main configuration disclosed in the embodiments is also applicable to liquid crystal display devices comprising a reflective function which reflects external light to utilize the reflecting light for displaying, in addition to the transmissive function, electronic-paper display devices comprising an electrophoretic element, display devices which apply micro-electromechanical systems (MEMS), display devices which apply electrochromism, or the like.

FIG. 1 is a decomposed perspective view showing a configuration example of a display device DSP according to an embodiment.

As shown in FIG. 1, a direction X, a direction Y and a direction Z are orthogonal to each other, but they may intersect with an angle other than 90 degrees. The direction X and the direction Y correspond to directions parallel to the main surface of a substrate which constitutes the display device DSP, and the direction Z corresponds to a thickness direction of the display device DSP.

The display device DSP comprises a display panel PNL, an illumination device IL, an IC chip 1 and a wiring substrate 2.

The display panel PNL comprises a first substrate SUB1 and a second substrate SUB2. The display panel PNL includes a display area DA on which images are displayed. The display panel PNL includes, for example, a plurality of pixels PX arrayed in a matrix, in the display area DA.

The IC chip 1 and the wiring substrate 2 may read signals from the display panel PNL, but they mainly function as signal sources which supply signals to the display panel PNL. The signal sources are mounted on one piece of the display panel PNL, in which the first substrate SUB1 is exposed from second substrate SUB2. Note that the IC chip 1 may be mounted on the wiring substrate 2. The wiring substrate 2 is, for example, a flexible printed board which can be bent.

The illumination device IL illuminates the display panel PNL. The illumination device IL comprises a light guide LG1, a light guide LG2, a plurality of light sources LS1 and a plurality of light sources LS2. The light guide LG2, the light guide LG1, the first substrate SUB1 and the second substrate SUB2 are arranged in this order along the direction Z.

The light guide LG1 is formed into a flat plate parallel to an X-Y plane defined by the direction X and the direction Y. The light guide LG1 comprises a main surface 1A opposing the display panel PNL, a main surface 1B on an opposite side to the main surface 1A, a side surface SF1 and a side surface SF2 on an opposite side to the side surface SF1. The side surface SF1 and the side surface SF2 are X-Z planes defined by, for example, the direction X and the direction Z. The light guide LG1 has a thickness T1. The thickness T1 is a length taken from the main surface 1A to the main surface 1B in the direction Z.

The light sources LS1 are arranged to be spaced apart from each other in the direction X. The light sources LS1 each oppose the side surface SF2.

The light guide LG2 is formed into a flat plate parallel to the X-Y plane. The light guide LG2 comprises a main surface 2A opposing the main surface 1B, a main surface 2B on an opposite side to the main surface 2A, a side surface SF3 and a side surface SF4 on an opposite side to the side surface SF3. The side surface SF3 and the side surface SF4 are, for example, X-Z planes. The light guide LG2 has a thickness T2. The thickness T2 is a length taken from the main surface 2A to the main surface 2B in the direction Z. In the example illustrated, the thickness T1 and the thickness T2 are substantially the same as each other. Note that the thickness T1 and the thickness T2 may be same as or different from each other.

The light sources LS2 are arranged to be spaced apart from each other in the direction X. The light sources LS2 each oppose the side surface SF3.

The light sources LS1 and the light sources LS2 each are a laser light source such as a semiconductor laser which emits polarized laser beams, for example. Note that the light sources LS1 and the light sources LS2 are not limited to those emitting laser beams, but they may be, for example, light emitting diodes.

The light sources LS1 and the light sources LS2 each may comprise a plurality of light emitting elements emitting light of different colors, respectively. For example, if the light sources LS1 and the light sources LS2 each comprise three light emitting elements emitting red, green, blue light, respectively, light of mixture of these colors (for example, white) can be obtained.

Figure 2:
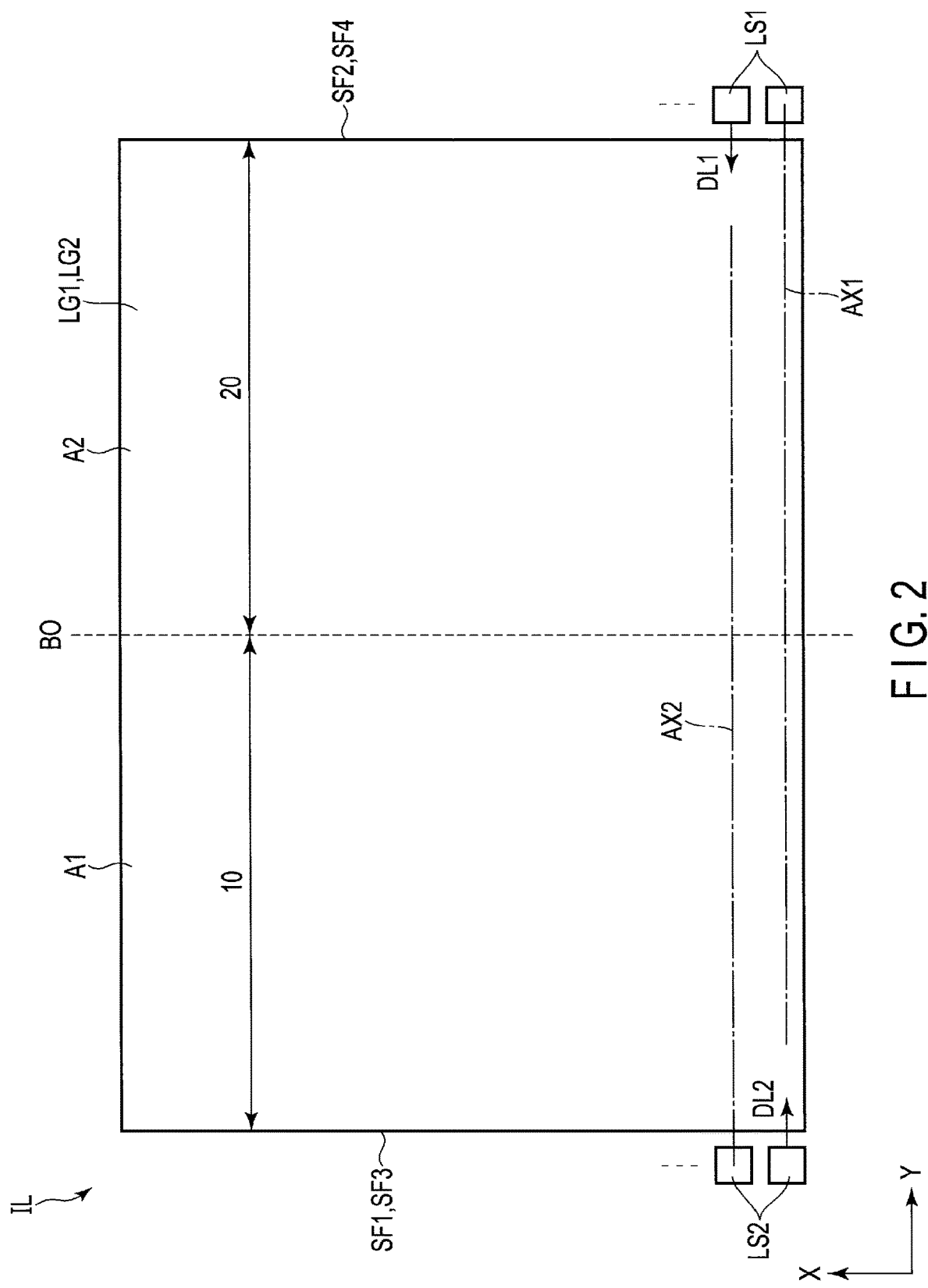
FIG. 2 is a plan view of an illumination device shown in FIG. 1.

FIG. 2 is a plan view of the illumination device IL shown in FIG. 1.

As shown in FIG. 2, the illumination device IL comprises a first area A1, a second area A2 and a boundary BO between the first area A1 and the second area A2.

The first area A1 and the second area A2 are adjacent to each other in the direction Y. The first area A1 has a length 10 in the direction Y, and the second area A2 has a length 20 in the direction Y. The length 10 and the length 20 are substantially equal to each other. Note that the length 10 and the length 20 may not necessarily be equal to each other. In the example illustrated, the light guide LG1 and the light guide LG2 are located respectively over the entire regions of the first area A1 and second area A2. In other words, the main surface 1A, the main surface 1B, the main surface 2A and the main surface 2B shown in the FIG. 2 are located in the first area A1 and the second area A2, respectively. The side surface SF1 and the side surface SF3 are located in the first area A1 and the side surface SF2 and the side surface SF4 are located in the second area A2. The side surface SF1 and the side surface SF2 oppose each other in the direction Y and the side surface SF3 and the side surface SF4 oppose each other in the direction Y. The side surface SF1 and the side surface SF3 overlap each other and the side surface SF2 and the side surface SF4 overlap each other. The boundary BO is equivalent to each of a middle point between the side surface SF1 and the side surface SF2 and a middle point between the side surface SF3 and the side surface SF4.

The light sources LS1 each emit light in an emission direction DL1 towards the side surface SF2. The intensity of light emitted from the light sources LS1 is at maximum in an optical axis AX1, and the emission direction DL1 is parallel to the optical axis AX1. The light sources LS2 each emit light in an emission direction DL2 towards the side surface SF3. The intensity of light emitted from the light sources LS2 is at maximum in an optical axis AX2, and the emission direction DL2 is parallel to the optical axis AX2.

Figure 3:
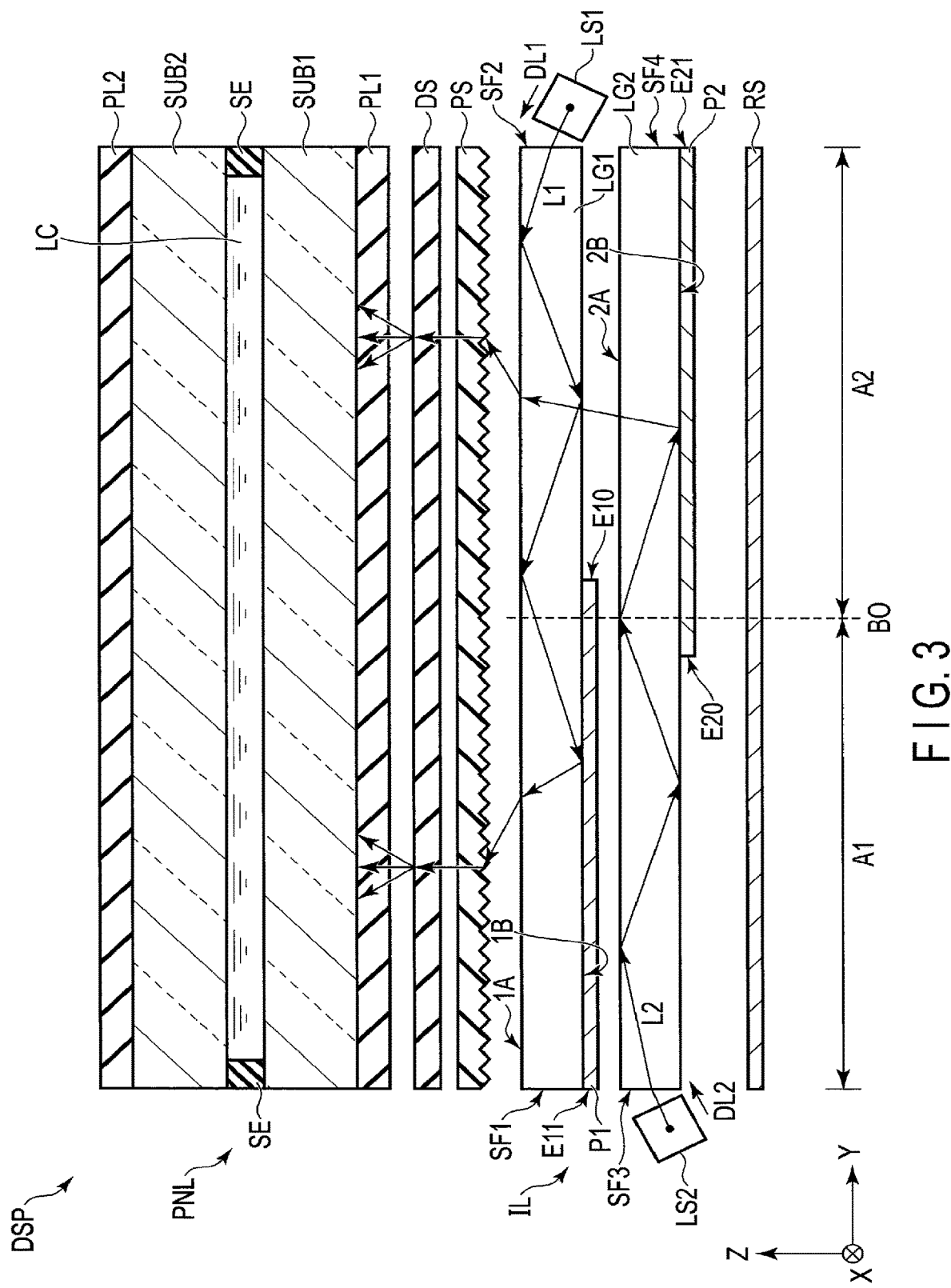
FIG. 3 is a cross-sectional view showing a display device shown in FIG. 1.

FIG. 3 is a cross-section showing the display device DSP shown in FIG. 1.

As shown in FIG. 3, the display panel PNL further comprises a liquid crystal layer LC, a sealant SE, a polarizer PL1 and a polarizer PL2.

The liquid crystal layer LC and the sealant SE are located between the first substrate SUB1 and the second substrate SUB2. The sealant SE adheres the first substrate SUB1 and the second substrate SUB2 together and also seals the liquid crystal layer LC.

The polarizer PL1 is adhered onto a lower surface of the first substrate SUB1. The second polarizer PL2 is adhered on an upper surface of the second substrate SUB2. A polarizing axis of the polarizer PL1 and a polarizing axis of the polarizer PL2 are, for example, orthogonal to each other.

The illumination device IL further comprises a first layer P1, a second layer P2, a diffusion sheet DS, a prism sheet PS and a reflective sheet RS.

The diffusion sheet DS is located between the display panel PNL and the light guide LG1. The diffusion sheet DS diffuses light entering the diffusion sheet DS to equalize the luminance of the light. The prism sheet PS is located between the diffusion sheet DS and the light guide LG1. The prism sheet PS concentrates the light emitted from, for example, the main surface 1A of the light guide LG1 in the direction Z. The reflective sheet RS opposes the main surface 2B of the light guide LG2. The reflective sheet RS reflects light leaking from within the light guide LG2, for example, to re-enter the light guide LG2.

The first layer P1 and the second layer P2 each are a layer including a plurality of prisms, which will be described later.

The first layer P1 is located on the main surface 1B. The first layer P1 extends from the first area A1 over the boundary BO to between the boundary BO and the side surface SF2. The first layer P1 comprises an end portion E10 and an end portion E11 on an opposite side to the end portion E10. The end portion E10 is located between the boundary BO and the side surface SF2, so as to be close to the boundary BO. The end portion E11 is close to the side surface SF1.

The second layer P2 is located on the main surface 2B. The second layer P2 extends from the second area A2 over the boundary BO to between the boundary BO and the side surface SF3. The second layer P2 has an end portion E20 and an end portion E21 on an opposite side to the end portion E20. The end portion E20 is located between the boundary BO and the side surface SF3, so as to be close to the boundary BO. The end portion E21 is close to the side surface SF4. The first layer P1 and the second layer P2 overlap each other the boundary BO and in the vicinity of the boundary BO in the direction Z.

The light source LS1 is located remote from the side surface SF2. The emission direction DL1 of the light source LS1 is a direction crossing a normal direction of the side surface SF2. The light source LS2 is located remote from the side surface SF3. The emission direction DL2 of the light source LS2 is a direction crossing a normal direction of the side surface SF3.

Next, light beams L1 emitted by the light sources LS1 and light beams L2 emitted by the light sources LS2 will be described.

The light beams L1 emitted by the light sources LS1 are refracted by the side surface SF2, so as to enter the light guide LG1. Of the light beams L1 entering the light guide LG1, light beams traveling towards the main surface 1A are reflected by an interface between the light guide LG1 and an air layer. On the other hand, of the light beams L1 entering the light guide LG1, light beams traveling towards the main surface 1B are reflected by an interface between the light guide LG1 and the air layer. Thus, in a region of the second area A2, where the first layer P1 is not provided, the light beams L1 travel in the light guide LG1 while repeatedly reflected. Of the light beams L1 traveling in the light guide LG1, a travel direction of light advancing towards the first layer P1 from the light guide LG1 is changed by a prism of the first layer P1 and thus the condition for total reflection of the main surface 1A is unapplied, thus enabling the emission of the light from the main surface 1A. The light emitted from the main surface 1A illuminates the display panel PNL via the prism sheet PS and the diffusion sheet DS. That is, in the region of the second area A2, where the first layer P1 is not provided(, or in the vicinity of the side surface SF2), the incident light beams L1 are inhibited from entering the display panel PNL from the side surface SF2.

Similarly, light beams L2 emitted by the light sources LS2 are refracted by the side surface SF3 and enter the light guide LG2. In a region of the first area A1, where the second layer P2 is not provided, the incident light beams L2 advance in the light guide LG2 while repeatedly reflected by the main surface 2A and the main surface 2B. Of the light traveling in the light guide LG2, a travelling direction of the light advancing towards the second layer P2 from the light guide LG2 is changed by a prism of the second layer P2, and thus the condition for total reflection of the main surface 2A is unapplied, thus enabling the emission of the light from the main surface 2A. The light emitted from the main surface 2A illuminates the display panel PNL via the light guide LG1, the prism sheet PS and the diffusion sheet DS. That is, in the region of the first area A1, where the second layer P2 is not provided(, or in the vicinity of the side surface SF3), the incident light beams L2 are inhibited from entering from the side surface SF3 to the display panel PNL.

The display panel PNL is illuminated by the emission light beams L1 from the light sources LS1 in the first area A1. The display panel PNL is illuminated by the emission light beams L2 from the light source LS2 in the second area A2.

Generally, the emission light beams from the light sources arranged at intervals each travel inside the light guide while scattering, but in the vicinities of the light sources, the emission light beams do not sufficiently mix each other. Therefore, in a display device which utilizes such light as illumination light, stripe-like non-uniformity in luminance and chromatic shift due to the difference in intensity may be visually recognized when planarly viewed. The difference in intensity between the illumination light beams is reduced further as the location is distant further from the light sources.

According to the embodiment, in the region of the second area A2, where the first layer P1 is not provided, the incident light beams L1 from the side surface SF2 are contained in the light guide LG1 and inhibited from entering the display panel PNL. In the second area A2, the light beams L1 from the light sources LS1 hardly enter the display panel PNL, but the light beams L2 from the light sources LS2 illuminate the display panel PNL. The first area A1 is distant from the side surface SF2 by a distance sufficient for the light beams L1 to mix with each other. Thus, degradation of the illumination quality due to non-uniformity in luminance and the chromatic shift of the illumination light can be suppressed in the first area A1.

Similarly, in the region of the first area A1, where the second layer is not provided, the incident light beams L2 from the side surface SF3 are contained in the light guide LG2, and inhibited from entering the display panel PNL. In the first area A1, the light beams L2 from the light sources LS2 hardly enter the display panel PNL, but the light beams L1 from the light sources LS1 illuminate the display panel PNL. The second area A2 is distant from the side surface SF3 by a sufficient distance for the light beams L2 to mix with each other. Thus, degradation of the illumination quality due to the non-uniformity of the illumination light can be suppressed in the second area A2.

Further, the first layer P1 extends over the boundary BO to the second area A2, and the second layer P2 extends over the boundary BO to the first area A1. Therefore, it is possible to avoid the reduction of the luminance level of the emission light of the illumination device IL in vicinity of the boundary BO. Note that when the end portion E10 of the first layer P1 and the end portion E20 of the second layer P2 are each located on the boundary BO, the luminance level of the emission light of the illumination device IL reduces in vicinity of the boundary BO.

Figure 4:
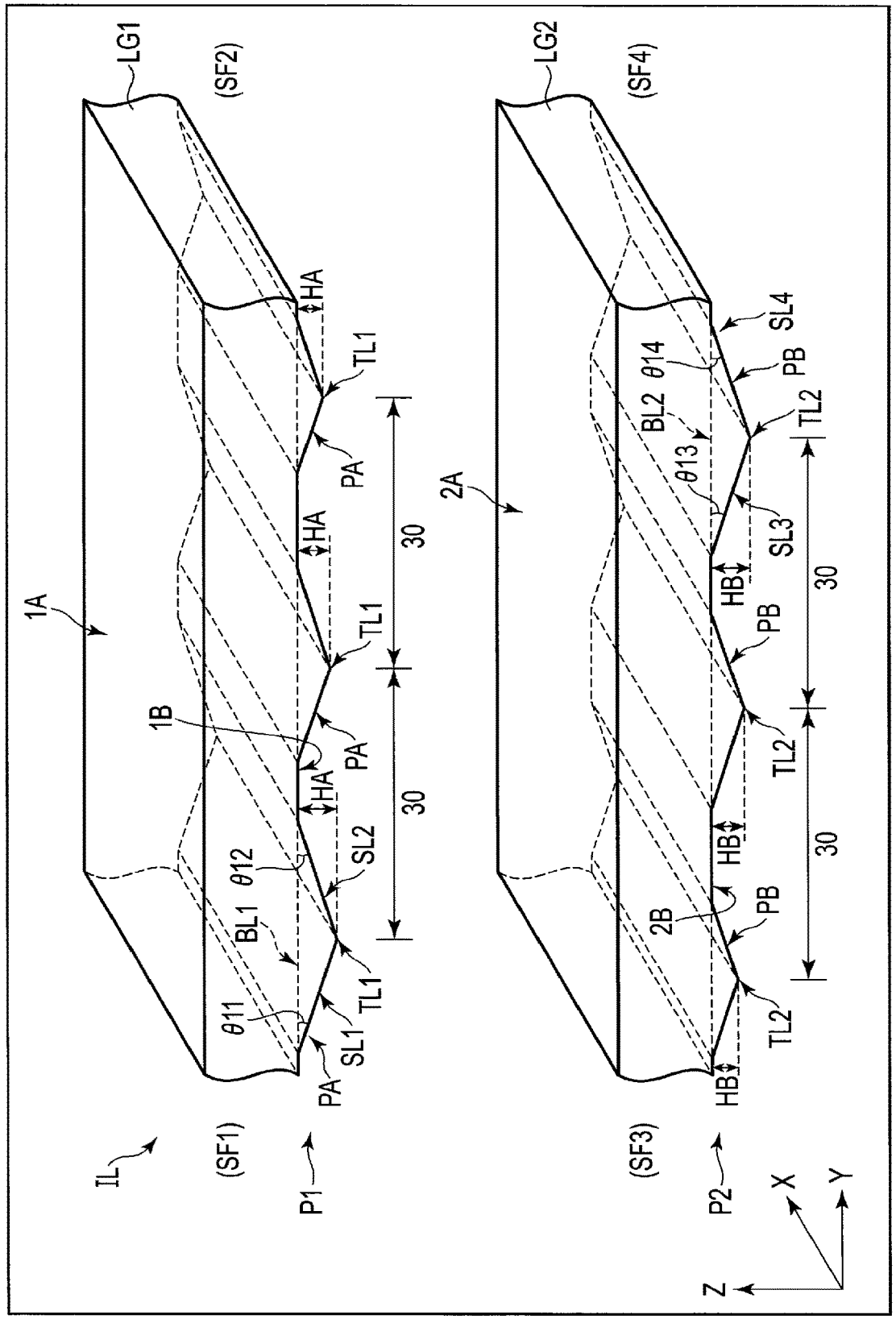
FIG. 4 is a diagram illustrating shapes of a first layer and a second layer, which is a perspective view of the illumination device shown in FIG. 3.

FIG. 4 is a diagram illustrating the shape of the first layer P1 and the second layer P2, and is a perspective view of the illumination device IL shown in FIG. 3. FIG. 4 shows only a part of light guide LG1, a part of the light guide LG2, a part of the first layer P1 and a part of the second layer P2 in the illumination device IL.

As shown in FIG. 4, the first layer P1 includes a plurality of prisms PA. The first layer P1 is constructed by the prisms PA arranged intermittently in the direction Y. The second layer P2 includes a plurality of prisms PB. The second layer P2 is constructed by the prisms PB arranged intermittently in the direction Y. The prisms PA are provided in the main surface 1B. The prisms PB are provided in the main surface 2B.

The prisms PA project from the main surface 1B towards the main surface 2A. The prisms PA each have a cross section parallel to the Y-Z plane, which is triangular, and extend in the direction X. In the example illustrated, the cross sections of the prisms PA are similar to each other. The prisms PA each comprise a slope SL1, a slope SL2, a reference plane BL1, an intersection TL1 and a height HA. The slope SL1 is located on a side surface SF1 side and the slope SL2 is located on a side surface SF2 side. The reference plane BL1 is located on the plane same that of the main surface 1B. The intersection TL1 is a line where the slope SL1 and the slope SL2 intersect each other. The intersections TL1 are arranged at equal intervals 30 in the direction Y. The intervals 30 are, for example, 0.1 mm. In the example illustrated, an angle θ11 made between the slope SL1 and the reference plane BL1 and an angle θ12 between the slope SL2 and the reference plane BL1 are equal to each other. Note that the angle θ11 corresponds to one of the interior angles of the cross section of the prism PA, and the angle θ12 corresponds to another one of the interior angles of the cross section of the prism PA. The cross section of the prism PA is an isosceles triangle. The height HA is the height of the prism PA in the normal direction of the main surface 1B. The height HA is equivalent to the length taken from the reference plane BL1 to the intersection TL1 along the direction Z.

The height HA of the prism PA decreases as the location approaches from the side surface SF1 to the side surface SF2 (in a direction indicated by an arrow pointing the direction Y). For example, the height HA of the prism PA becomes higher as the location approaches from the end portion E10 of the first layer P1 to the end portion E11 shown in FIG. 3. As the location approaches from the end portion E10 to the end portion E11, the ratio of the prism PA (the reference plane BL1) per unit area in the X-Y plane increases and the ratio of the main surface 1B per unit area in the X-Y plane decreases. Further, when the light travelling in the light guide LG1 advances to the prism PA of the first layer P1 and then is emitted from the light guide LG1, the quantity of light traveling in the light guide LG1 decreases. Thus, the illumination device IL can irradiate the illumination light of a uniform brightness distribution to the display panel PNL in the first area A1.

The prisms PB each project from the main surface 2B in the direction Z. The prisms PB each have a cross section parallel to the Y-Z plane, which is triangular, and extend in the direction X. In the example illustrated, the cross sections of the prisms PB are similar to each other. The prisms PB each comprise a slope SL3, a slope SL4, a reference plane BL2, an intersection TL2 and a height HB. The slope SL3 is located on a side surface SF3 side, and the slope SL4 is located on a side surface SF4 side. The reference plane BL2 is located on the plane same as that of the main surface 2B. The intersection TL2 is a line where the slope SL3 and the slope SL4 intersect each other. The intersections TL2 are arranged at equal intervals 30 along the direction Y. In the example illustrated, an angle θ13 made by the slope SL3 and the reference plane BL2 and an angle θ14 made by the slope SL4 and the reference plane BL2 are equal to each other. Note that the angle θ13 corresponds to one of the interior angles in the cross section of the prism PB, and the angle θ14 corresponds to another one of the interior angles in the cross section of the prism PB. The cross section of the prism PB is an isosceles triangle. The height HB is the height of the prism PB in the normal direction of the main surface 2B. The height HB is equivalent to the length taken from the reference plane BL2 to the intersection TL2 along the direction Z.

The height HB of the prism PB decreases as the location approaches from the side surface SF4 to the side surface SF3 (in an opposite direction indicated by the arrow pointing the direction Y). As the location approaches from the side surface SF4 to the side surface SF3, the ratio of the prism PB (the reference plane BL2) per unit area in the X-Y plane decreases and the ratio of the main surface 2B per unit area in the X-Y plane increases. Further, when the light travelling in the light guide LG2 advances to the prism PB of the second layer P2 and then is emitted from the light guide LG2, the quantity of light traveling in the light guide LG2 decreases. Thus, the illumination device IL can irradiate the illumination light of a uniform brightness distribution to the display panel PNL in the second area A1.

FIG. 5 is a partial cross-sectional view of the light guide LG1, the first layer P1 and a light source LS1 shown in FIG. 3.

As shown in FIG. 5, the light source LS1 comprises a light emission point LP1 and a light emission surface LF1. The light emission point LP1 is a point from where a light beam L1 having an optical axis AX1 parallel to an emission direction DL1 is emitted. The light beam L1 emitted from the light emission point LP1 travels while spreading. The emission surface LF1 corresponds to, for example, an outer surface of the light source LS1.

The emission direction DL1 is inclined to the direction Y and the direction Z. The emission direction DL1 and the side surface SF2 are not orthogonal to each other. That is, the emission direction DL1 intersects a normal direction of the side surface SF2. With this configuration, the light beam L1 is refracted when entering the light guide LG1. An incident angle θ1 of the light beam L1 to the light guide LG1 is smaller than an angle made by the emission direction DL1 and the direction Y. Further, the incident angle θ1 is equal to the angle θ11.

In the example illustrated, the light beam L1 traveling through the light guide LG1 is reflected by the slope SL1 of the prism PA. The light beam L1 reflected by the slope SL1 is inapplicable to the total reflection condition of the main surface 1A and is refracted by an interface between the main surface 1A and the air layer, to be emitted at an emission angle θ2 from the main surface 1A. The emission angle θ2 is an angle made by the light emitted from the main surface 1A and the normal line of the main surface 1A. The refractive index of the light guide LG1 is represented by n.

A relationship between the angle θ11 of the prism PA and the refractive index n of the emission angle θ2, can be expressed by the following formula.

$$\theta 11 = \frac{1}{3}\left(90 - \sin^{-1}\left(\frac{1}{n}\sin\theta 2\right)\right) \quad \text{Formula 1}$$

A structure similar to that of FIG. 5 can be applied to the side surface SF3 and the light sources LS2 as well. That is, the emission direction DL2 of the light source LS2 and the side surface SF3 are not orthogonal, but intersects the emission direction DL2 and the normal direction of the side surface SF3. Note that the structure of the side surface SF3 and the light sources LS2 may be different from the structure shown in FIG. 5.

Figure 6:
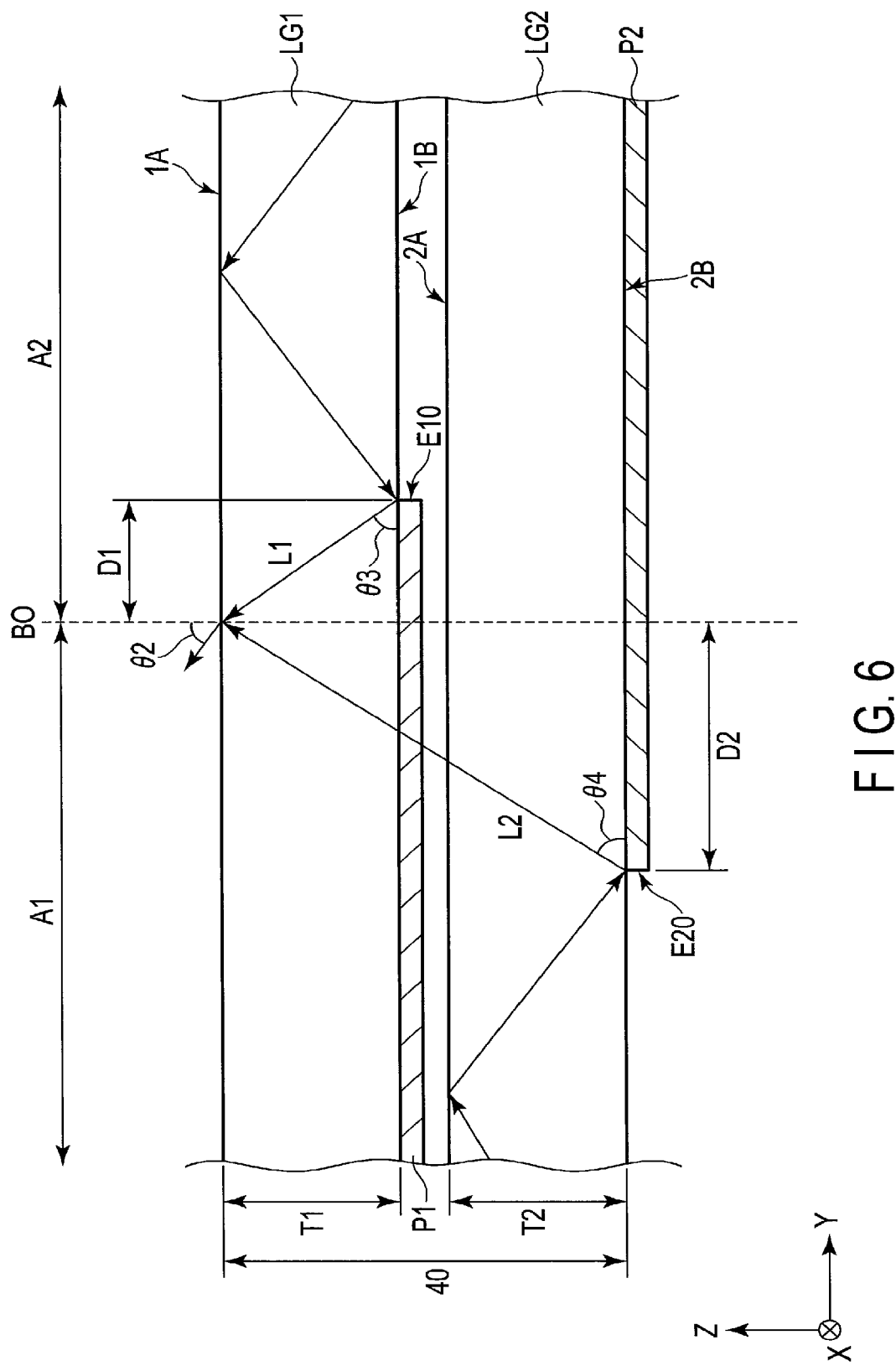
FIG. 6 is a cross section of the illumination device near the boundary.

FIG. 6 is a cross section of the illumination device IL in the vicinity of the boundary BO.

As shown in FIG. 6, the first layer P1 has a length D1 in the second area A2. The length D1 is equivalent to a length taken from the boundary BO to the end portion E10 in the direction Y. The second layer P2 has a length D2 in the first area A1. The length D2 is equivalent to a length taken from the boundary BO to the end portion E20 in the direction Y. In the example illustrated, the length D2 is equal to twice the length D1. Note that it suffices if the length D2 is greater than the length D1.

A relationship between the length D1, the thickness T1, the emission angle θ2 and the refractive index n can be expressed by the following formula.

$$D1 = 2 \times T1 \times \tan\left\{\sin^{-1}\left(\frac{1}{n}\sin\theta 2\right)\right\} \quad \text{Formula 2}$$

The length 40 is a length taken from the main surface 2B to the main surface 1A in the direction Z. The length 40 is substantially a total of the thickness T1 and the thickness T2 (or twice the thickness T1). In the example illustrated, the angle made by the light beam L1 reflected by the end portion E10 of the first layer P1 and the main surface 1B is angle θ3. The angle made by the light beam L2 reflected by the end portion E20 of the second layer P2 and the main surface 2B is angle θ4. The angles θ3 and θ4 are acute angles, respectively, and are equal to each other.

According to this embodiment, the first layer P1 has a length D1 in the second area A2, and the second layer P2 has a length D2 in the first area A1. The light travelling through the light guide LG1 is emitted from the main surface 1A in the boundary BO by the prisms PA located in the end portion E10. The light travelling through the light guide LG2 is emitted from the main surface 1A in the boundary BO by the prisms PB located in the end portion E20. With this configuration, as compared to the case where the first layer P1 does not extend to the second area A2 and the second layer P2 do not extend to the first area A1, the illumination device IL can also emit illumination light of a uniform luminance in the vicinity of the boundary BO as well.

FIG. 7 is a cross section of the first layer P1 and the light guide LG1 in the vicinity of the side surface SF1.

As shown in FIG. 7, the end portion E11 of the first layer P1 is spaced apart from the side surface SF1 by a distance of a length D3 in the direction Y. A relationship between the length D3, the thickness T1, the emission angle θ2 and the refractive index n, can be expressed by the following formula.

$$D3 = T1 \times \tan\left\{\sin^{-1}\left(\frac{1}{n}\sin\theta 2\right)\right\} \quad \text{Formula 3}$$

In the example illustrated, the light beam L1 traveling to the end portion E11 is reflected by the first layer P1, and then advances towards the main surface 1A without advancing to the side surface SF1. Thus, the light beam L1 traveling in the light guide LG1 and then reflected by the first layer P1 can be inhibited from being reflected by the side surface SF1 thereafter, which may cause increase in luminance of the illumination light of the illumination device IL partially in the vicinity of the side surface SF1.

A structure similar to that of FIG. 7 can be applied to the end portion E21 of the second layer P2 as well. That is, the end portion E21 of the second layer is spaced apart from the side surface SF4 by a distance of the length D3 in the direction Y.

In the configuration example described above, the direction Y is equivalent to the first direction, the direction X is equivalent to the second direction, the light sources LS1 are equivalent to the first light sources, the light sources LS2 are equivalent to the second light sources, the light guide LG1 is equivalent to the first light guide, the light guide LG2 is equivalent to the second light guide, the main surface 1A is equivalent to the first main surface, the main surface 1B is equivalent to the second main surface, the main surface 2A is equivalent to the third main surface, the main surface 2B is equivalent to the fourth main surface, the side surfaces SF1 to SF4 are equivalent to the first to fourth sides, respectively, the prisms PA are equivalent to the first prisms, the prisms PB are equivalent to the second prisms, slopes SL1 to SL4 are equivalent to the first to fourth slopes, respectively, the intersection TL1 is equivalent to the first intersection, the intersection TL2 is equivalent to the second intersection, the reference plane BL1 is equivalent to the first reference plane, the reference plane BL2 is equivalent to the second reference plane, the end portion E10 is equivalent to the first end portion, the end portion E20 is equivalent to the second end portion, the length D1 is equivalent to the first length, and the length D2 is equivalent to the second length.

Figure 8:
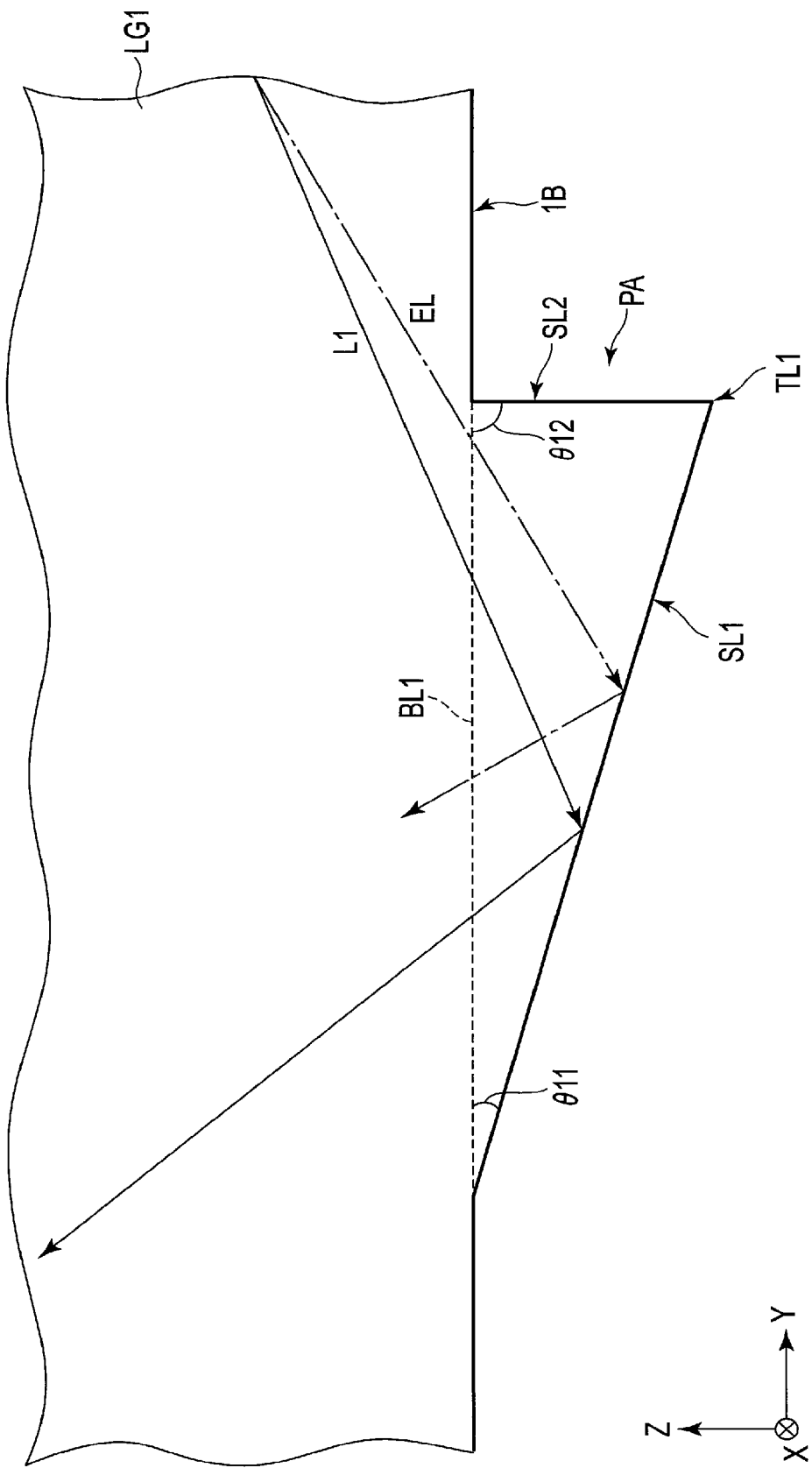
FIG. 8 is a cross section of a modified example of the embodiment.

FIG. 8 is a cross section showing a modified example of the embodiment.

As shown in FIG. 8, a prism PA of the modified example is different from a prism PA of the embodiment in that the angle θ11 and the angle θ12 are not equal to each other. The angle θ12 is greater than the angle θ11. In the example illustrated, the angle θ12 is 90 degrees, and the Y-Z cross section of the prism PA is a right-angled triangle. The area of the slope SL1 is greater than the area of the slope SL2.

The light beam L1 travelling in the light guide LG1 advances in the light guide LG1 while spreading. The diffused light EL shown in the FIG. 8 is equivalent to the light spreading from the light beam L1. In the modified example illustrated, the area of the slope SL1 is greater as compared to the case of FIG. 5, in which the cross section of the prism PA is a right-angled triangle. With this configuration, chances are higher that the diffused light EL are reflected by the slope SL1 of the prism PA, thereby making it possible to increase the luminance of the illumination light of the illumination device IL.

A structure similar to that of FIG. 8 can be applied to the prism PB as well. That is, the angle θ14 is greater than the angle θ13, and the area of the slope SL4 is greater than the area of the slope SL3.

As explained above, according to the embodiments, an illumination device which can suppress the deterioration in illumination quality and such a display device can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An illumination device comprising:
   a first area;
   a second area adjacent to the first area in a first direction;
   a first light guide comprising a first main surface located in the first area and the second area, a second main surface located in the first area and the second area, on an opposite side to the first main surface, a first side surface located in the first area and a second side surface located in the second area on an opposite side to the first side surface in the first direction;
   a plurality of first light sources opposing the second side surface;
   a second light guide comprising a third main surface opposing the second main surface and located in the first area and the second area, a fourth main surface located in the first area and the second area, on an opposite side to the third main surface, a third side surface located in the first area, and a fourth side surface located in the second area and opposing the third side surface in the first direction;
   a plurality of second light sources opposing the third side surface;
   a first layer including a plurality of first prisms provided on the second main surface; and
   a second layer including a plurality of second prisms provided on the fourth main surface,
   the first layer extending from the first area over a boundary between the first area and the second area to between the second side surface and the boundary,
   the second layer extending from the second area over the boundary to between the third side surface and the boundary,
   a second length of the second layer in the first area in the first direction being greater than a first length of the first layer in the second area in the first direction.

2. The device of claim 1, wherein
   the second length is twice the first length.

3. The device of claim 1, wherein
   the plurality of first prisms each have a triangular cross section, extend in a second direction which intersects the first direction, and comprise a first slope on a first side surface side, a second slope on a second side surface side, and a first intersection where the first slope and the second slope intersect each other,
   the plurality of second prisms each have a triangular cross section, extend in the second direction, and comprise a third slope on a third side surface side, a fourth slope on a fourth side surface side, and a second intersection where the third slope and the fourth slope intersect each other,
   the first intersections are arranged along the first direction at equal intervals,
   the second intersections are arranged along the first direction at equal intervals,
   a height of the first prisms in a normal direction of the second main surface decreases from the first side surface towards the second side surface, and
   a height of the second prisms in a normal direction of the fourth main surface decreases from the fourth side surface towards the third side surface.

4. The device of claim 3, wherein
   the plurality of first prisms each comprise a first reference plane located on a plane same as that of the second main surface,
   the plurality of second prisms each comprise a second reference plane located on a plane same as that of the fourth main surface,
   an angle made by the second slope and the first reference plane is greater than or equal to an angle made by the first slope and the first reference plane, and
   an angle made by the third slope and the second reference plane is greater than or equal to an angle made by the fourth slope and the second reference plane.

5. The device of claim 1 wherein
   the first layer includes a first end portion located close to the first side surface,
   the second layer includes a second end portion located close to the fourth side surface,
   the first end portion is spaced away from the first side surface in the first direction, and
   the second end portion is spaced away from the fourth side surface in the first direction.

6. The device of claim 1, wherein
   the plurality of first light sources and the plurality of second light sources each are a laser light source.

7. A display device comprising:
   an illumination device; and
   a display panel which displays images,
   the illumination device comprising:
     a first area;
     a second area adjacent to the first area in a first direction;
     a first light guide comprising a first main surface located in the first area and the second area, a second main surface located in the first area and the second area, on an opposite side to the first main surface, a first side surface located in the first area and a second side surface located in the second area on an opposite side to the first side surface in the first direction;
     a plurality of first light sources opposing the second side surface;
     a second light guide comprising a third main surface opposing the second main surface and located in the first area and the second area, a fourth main surface located in the first area and the second area, on an opposite side to the third main surface, a third side surface located in the first area, and a fourth side surface located in the second area and opposing the third side surface in the first direction;
     a plurality of second light sources opposing the third side surface;
     a first layer including a plurality of first prisms provided on the second main surface; and
     a second layer including a plurality of second prisms provided on the fourth main surface, the first layer extending from the first area over a boundary between the first area and the second area to between the second side surface and the boundary, the second layer extending from the second area over the boundary to between the third side surface and the boundary, a second length of the second layer in the first area in the first direction being greater than a first length of the first layer in the second area in the first direction, the display panel opposing the first main surface.

8. The device of claim 7, wherein
the second length is twice the first length.

9. The device of claim 7, wherein
the plurality of first prisms each have a triangular cross section, extend in a second direction which intersects the first direction, and comprise a first slope on a. first side surface side, a second slope on a second side surface side, and a first intersection where the first slope and the second slope intersect each other, the plurality of second prisms each have a triangular cross section, extend in the second direction, and comprise a third slope on a third side surface side, a fourth slope on a fourth side surface side, and a second intersection where the third slope and the fourth slope intersect each other, the first intersections are arranged along the first direction at equal intervals, the second intersections are arranged along the first direction at equal intervals, a height of the first prisms in a normal direction of the second main surface decreases from the first side surface towards the second side surface, and a height of the second prisms in a normal direction of the fourth main surface decreases from the fourth side surface towards the third side surface.

10. The device of claim 9, wherein
the plurality of first prisms each comprise a first reference plane located on a plane same as that of the second main surface, the plurality of second prisms each comprise a second reference plane located on a plane same as that of the fourth main surface, an angle made by the second slope and the first reference plane is greater than or equal to an angle made by the first slope and the first reference plane, and an angle made by the third slope and the second reference plane is greater than or equal to an angle made by the fourth slope and the second reference plane.

11. The device of claim 7, wherein
the first layer includes a first end portion located close to the first side surface, the second layer includes a second end portion located close to the fourth side surface, the first end portion is spaced away from the first side surface in the first direction, and the second end portion is spaced away from the fourth side surface in the first direction.

12. The device of claim 7, wherein
the plurality of first light sources and the plurality of second light sources each are a laser light source.

* * * * *